(12) United States Patent
Chang

(10) Patent No.: US 6,510,718 B1
(45) Date of Patent: Jan. 28, 2003

(54) ANTI-THEFT DEVICE FOR STEERING WHEEL

(76) Inventor: Tsao Chia Chang, P.O. Box 10-69, Chong Ho, Taipei (TW), 235

( * ) Notice: Subject to any disclaimer, the term of this patent is extended or adjusted under 35 U.S.C. 154(b) by 0 days.

(21) Appl. No.: 10/062,781

(22) Filed: Feb. 5, 2002

(51) Int. Cl.[7] ............... B60R 25/02; E05B 13/10
(52) U.S. Cl. ............... 70/209; 70/237; 70/238; 70/226
(58) Field of Search ............... 70/209–212, 226, 70/225, 238, 237

(56) References Cited

U.S. PATENT DOCUMENTS

| | | | | |
|---|---|---|---|---|
| 5,239,849 A | * | 8/1993 | Gallardo | 70/209 |
| 5,381,679 A | * | 1/1995 | Cummins | 70/209 |
| 5,537,847 A | * | 7/1996 | Dalton et al. | 70/209 |
| 5,996,736 A | * | 12/1999 | Stankiewicz | 182/127 |
| 6,016,674 A | * | 1/2000 | Yang | 70/209 |
| 6,282,930 B1 | * | 9/2001 | Strauss et al. | 70/209 |
| 6,422,050 B1 | * | 7/2002 | Ho | 70/209 |

* cited by examiner

*Primary Examiner*—Anthony Knight
*Assistant Examiner*—John B. Walsh

(57) ABSTRACT

An anti-theft device for a steering wheel of a vehicle includes a base plate and a casing each having a hook for engaging onto the steering wheel. A housing is secured on the base plate. The casing includes a beam slidably received in the housing and having a channel formed between a stop shoulder and an end rib. A lever has one end slidably received in the housing and has a catch slidably engaged in the channel of the beam. A lock may lock the lever to the housing and the base plate, to secure the casing and the base plate together on the steering wheel.

3 Claims, 5 Drawing Sheets

ANTI-THEFT DEVICE FOR STEERING WHEEL

BACKGROUND OF THE INVENTION

1. Field of the Invention

The present invention relates to an anti-theft device, and more particularly to an anti-theft device for attaching onto and for locking steering wheels.

2. Description of the Prior Art

Various kinds of typical anti-theft devices have been developed and attached onto the steering wheels for locking or securing the steering wheels and for preventing the steering wheels from being operated by any unauthorized persons. However, most of the anti-theft devices comprise a complicated configuration that may not be easily operated or assembled, and may not be easily used by the users.

The present invention has arisen to mitigate and/or obviate the afore-described disadvantages of the conventional anti-theft devices.

SUMMARY OF THE INVENTION

The primary objective of the present invention is to provide an anti-theft device including a simplified configuration for allowing the anti-theft device to be easily manufactured and to be easily used and operated by the users.

In accordance with one aspect of the invention, there is provided an anti-theft device for a steering wheel of a vehicle, the anti-theft device comprising a base plate including a first end having a first hook for engaging onto the steering wheel, a housing secured on the base plate and including a chamber formed therein, a casing including a second hook for engaging onto the steering wheel, and including a beam extended therefrom and slidably received in the chamber of the housing, the beam including a channel formed therein and defined between a stop shoulder and an end rib, a lever including a first end slidably received in the chamber of the housing and having a catch extended therefrom and slidably engaged in the channel of the beam and movable between the stop shoulder and the end rib of the beam, the lever including a second end extendible outward of the housing, and means for locking the lever to the housing and the base plate, to secure the casing and the base plate together and to secure the casing and the base plate on the steering wheel. The anti-theft device thus includes a simplified configuration having fewer elements or parts for allowing the anti-theft device to be easily manufactured and to be easily used and operated by the users.

The lever includes a plurality of apertures formed therein, the base plate includes an orifice formed therein, the locking means includes a lock core having a lock tongue selectively engaged through the apertures of the lever and the orifice of the base for locking the lever and the base plate together.

The lever includes a hand grip provided on the second end thereof for pulling the lever outward of the chamber of the housing.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 4:
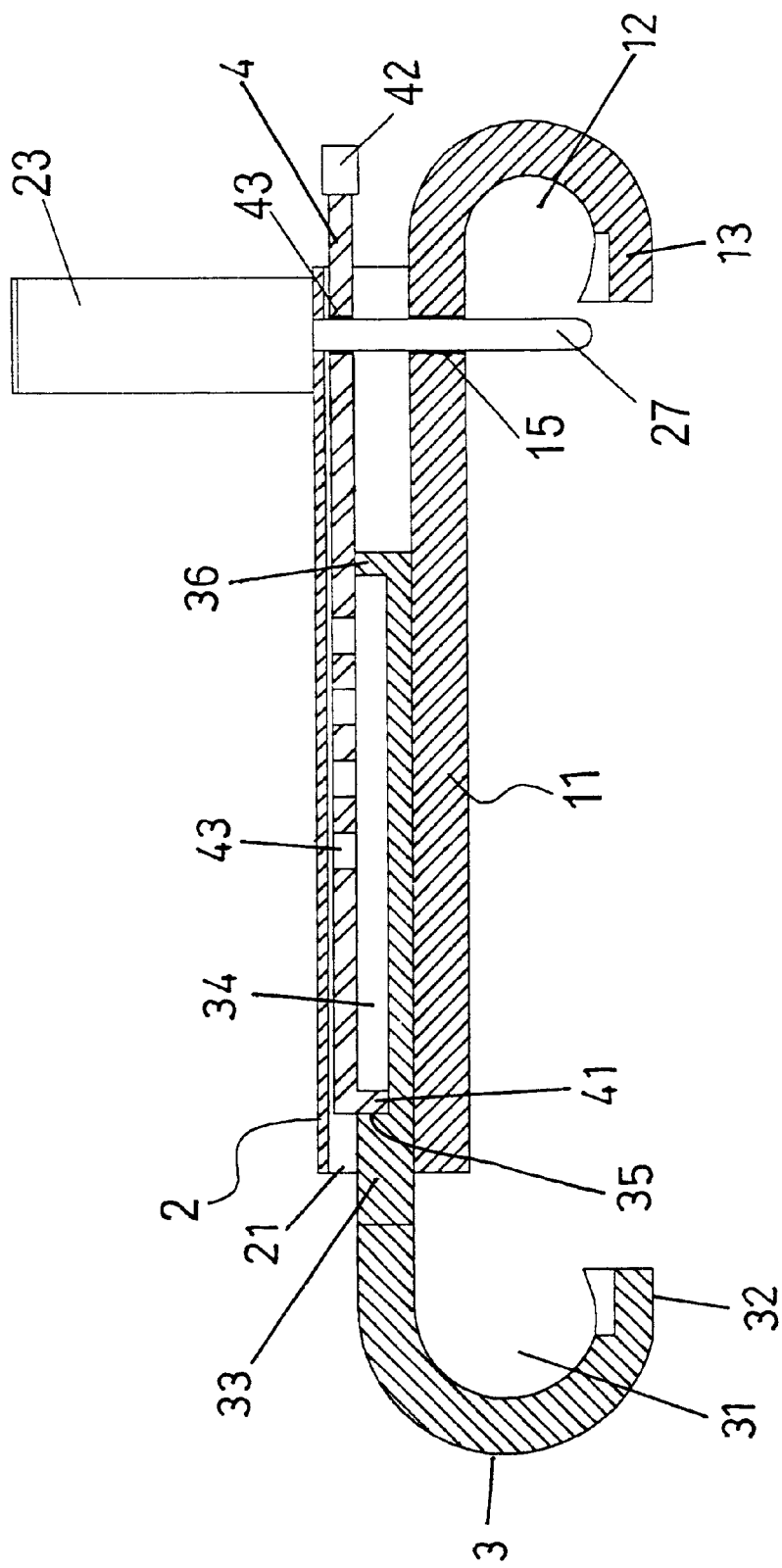
FIG. 4 is a cross sectional view taken along lines 4—4 of FIG. 2.

Referring to the drawings, and initially to FIGS. 1–4, an anti-theft device in accordance with the present invention comprises a base plate 11 including an engaging opening 12 formed in one end thereof and formed or defined by a hook 13 for receiving the peripheral portion of the steering wheel 5 (FIGS. 1, 5), and including an orifice 15 formed therein and located close to the hook 13. A housing 2 is secured onto the base plate 11 with such as the welding processes, and includes a chamber 21 formed therein or formed between the housing 2 and the base plate 11. A barrel 23 is secured on the housing 2 and located closer to the hook 13 and aligned with the orifice 15 of the base plate 11. A lock core 24 is slidably engaged in the barrel 23, and includes a key hole 25 for receiving the predetermined keys, and includes a lock tongue 27 extendible through the orifice 15 of the base plate 11 (FIGS. 4, 5).

A casing 3 also includes an engaging opening 31 formed in one end thereof and formed or defined by another hook 32 for receiving the peripheral portion of the steering wheel 5 (FIGS. 1, 5), and includes a beam 33 extended therefrom and slidably engaged in said chamber 21 of the housing 2. The beam 33 includes a recess or a channel 34 formed therein, and formed or defined between a stop shoulder 35 and an end rib 36. A lever 4 is also slidably engaged in said chamber 21 of the housing 2, and includes a catch 41 extended therefrom and slidably engaged in said channel 34 of the beam 33 and movable between the stop shoulder 35 and the end rib 36 of the beam 33. The lever 4 includes a hand grip 42 located outside the housing 2 for moving the lever 4 relative to the housing 2 and the beam 33, and includes one or more apertures 43 formed therein for aligning with and for selectively receiving the lock tongue 27 (FIGS. 4, 5).

Figure 1:
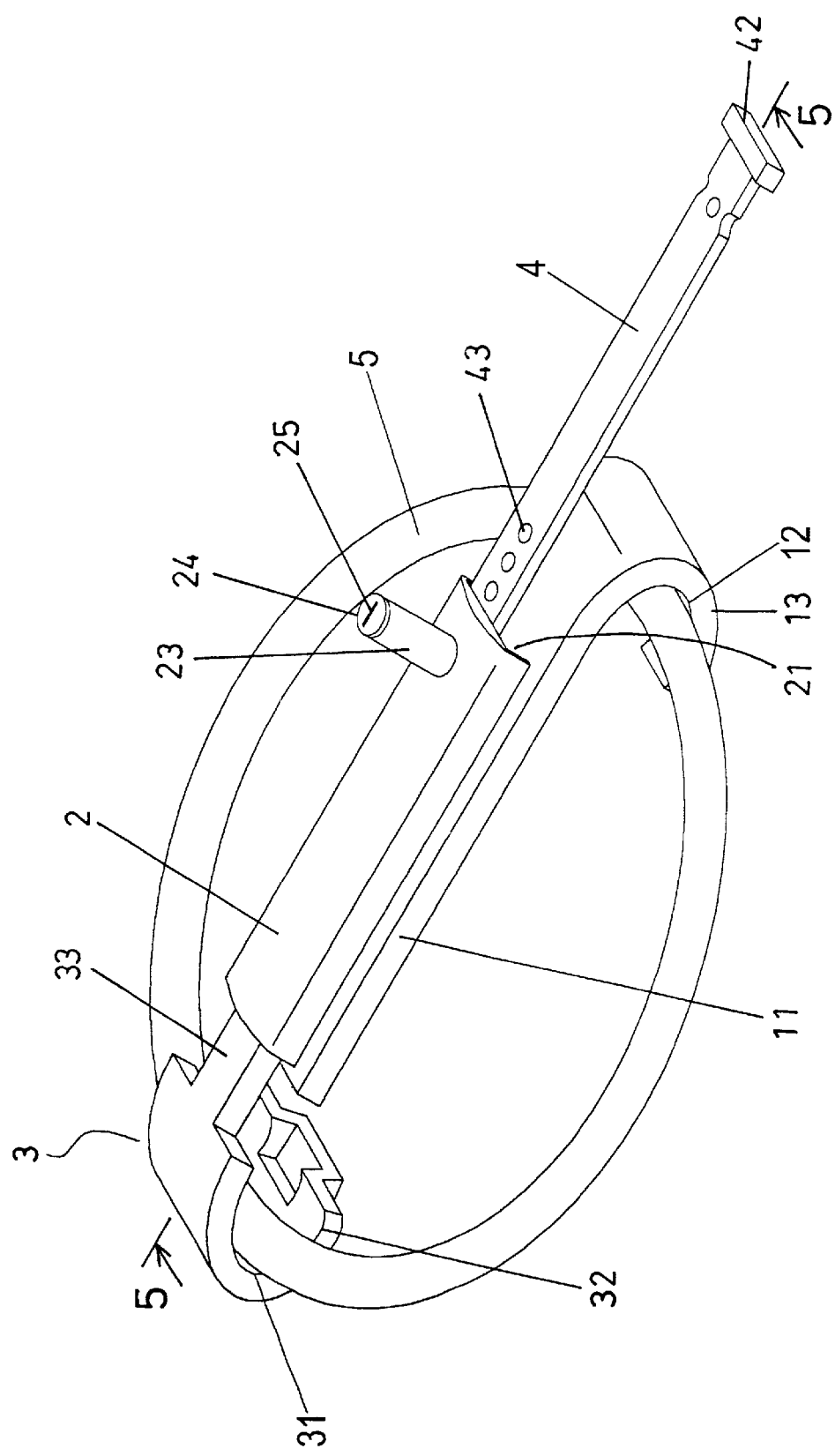
FIG. 1 is a perspective view of an anti-theft device in accordance with the present invention, illustrating the attachment of the anti-theft device onto the steering wheel of a vehicle.
Figure 2:
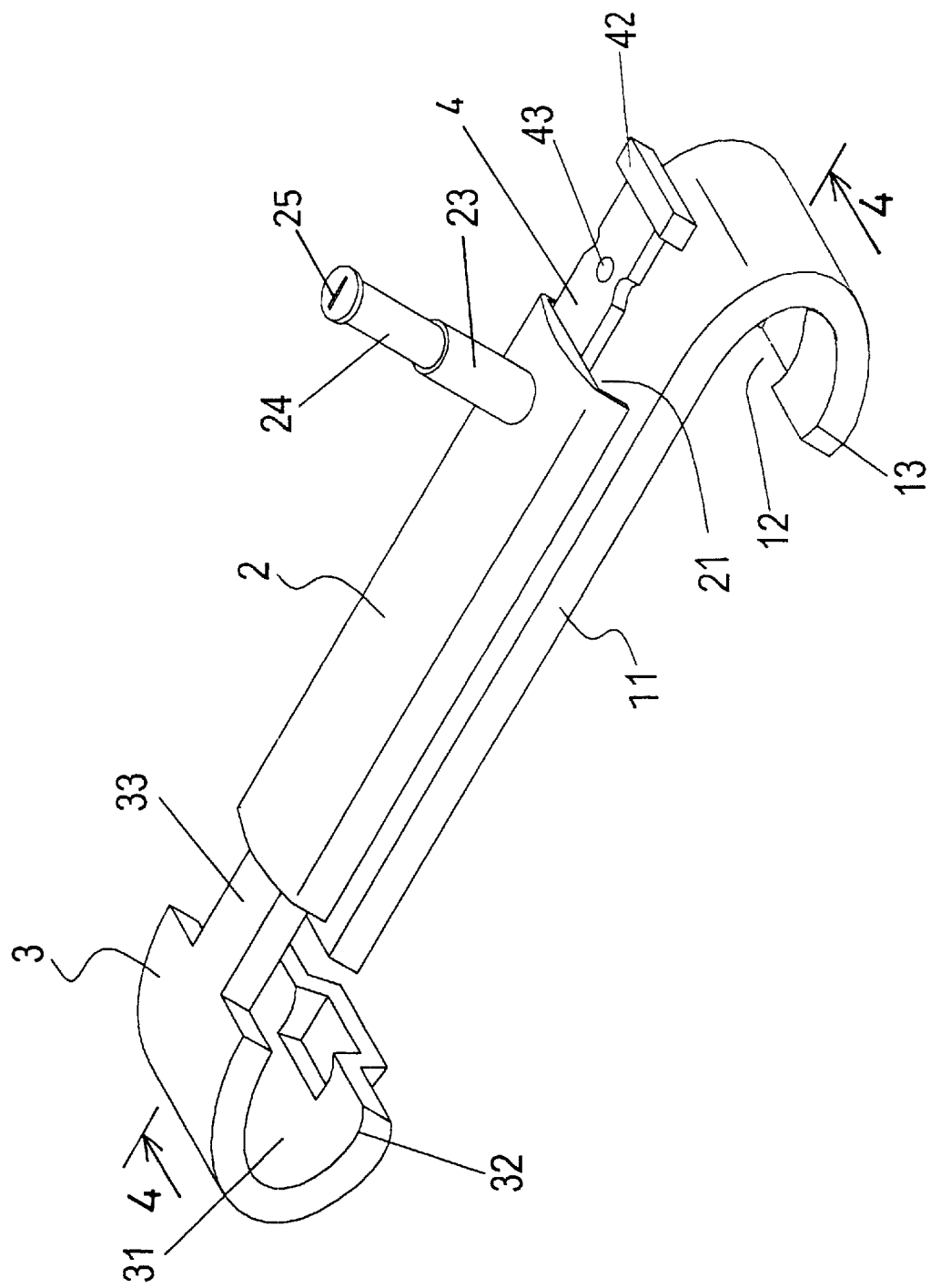
FIG. 2 is a perspective view of the anti-theft device.
Figure 3:
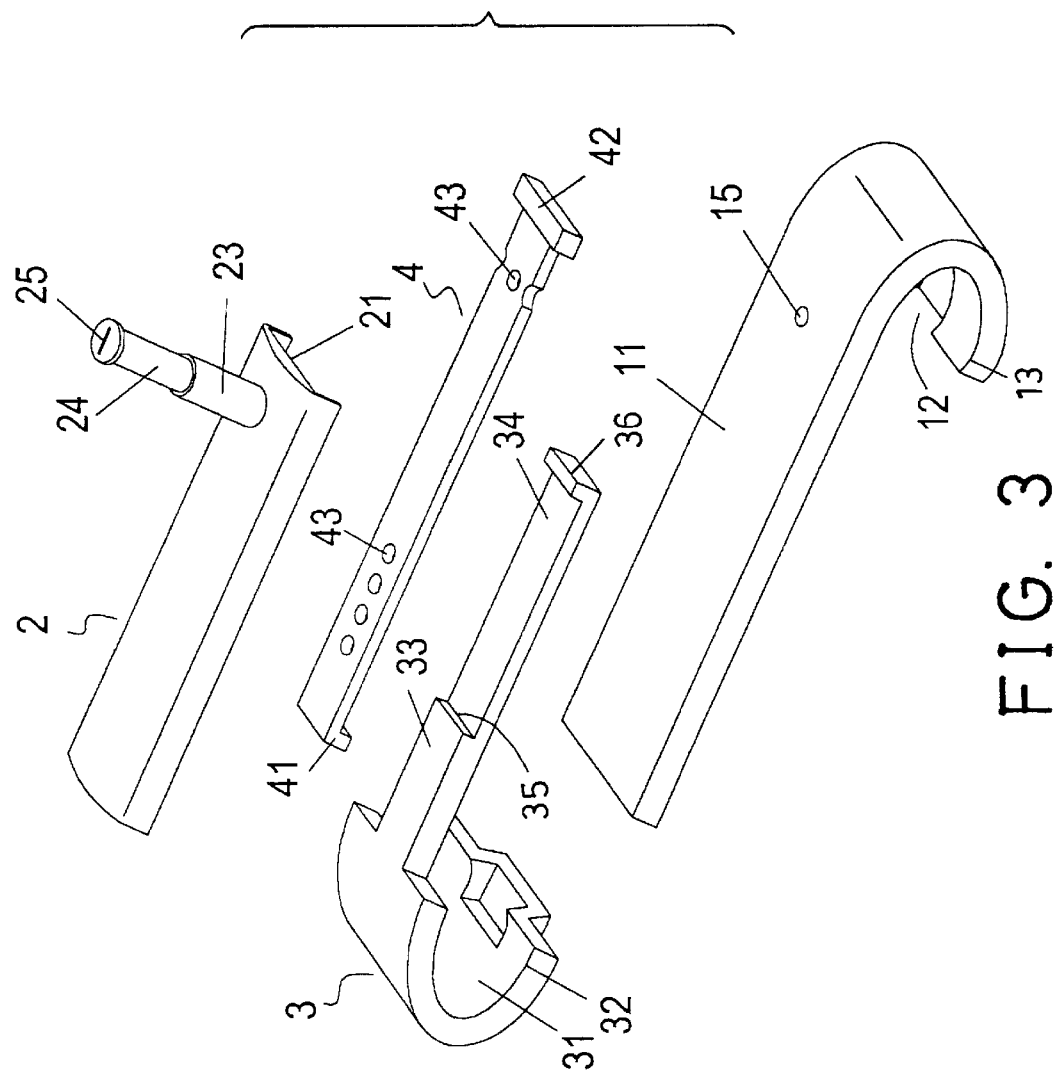
FIG. 3 is a partial exploded view of the anti-theft device.
Figure 5:
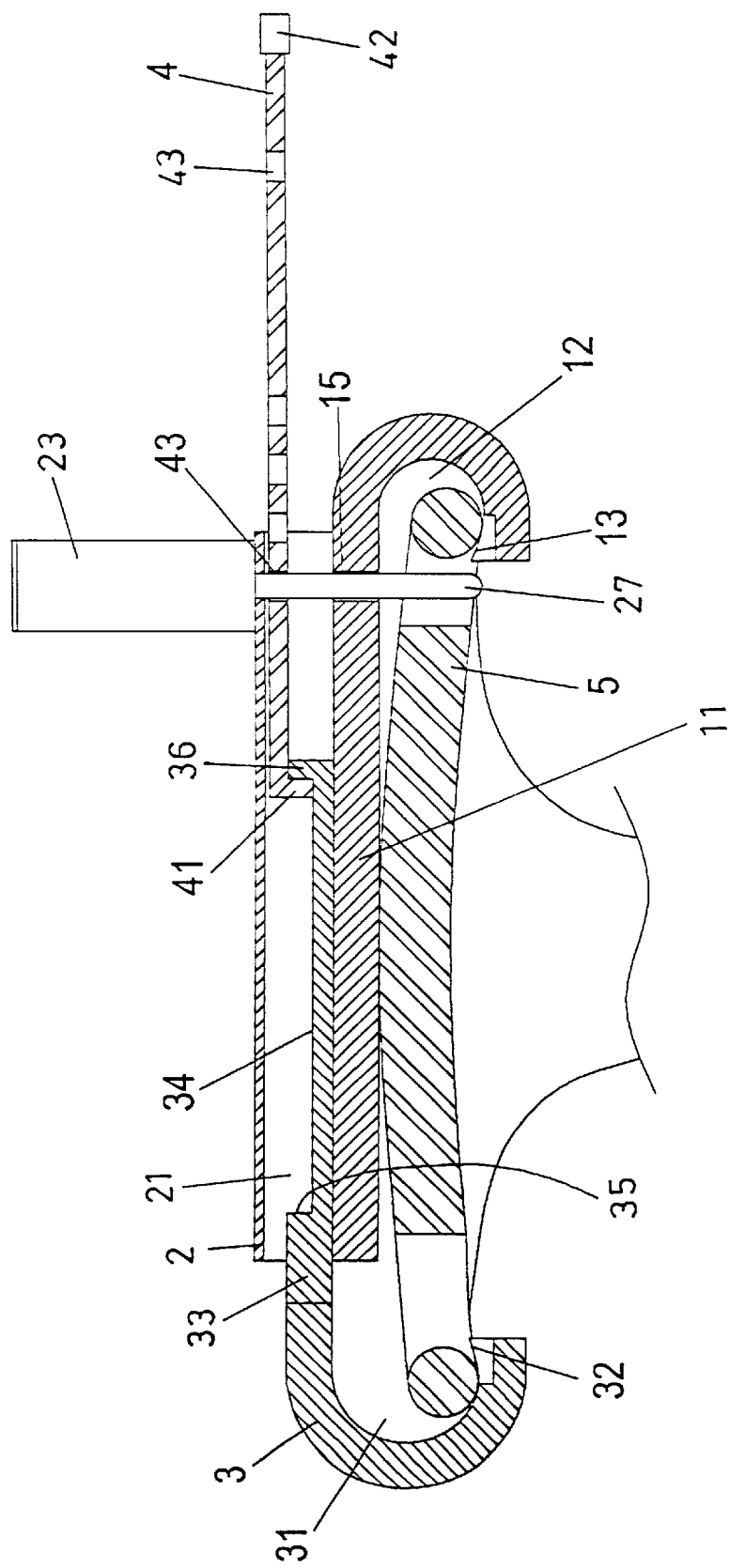
FIG. 5 is a cross sectional view taken along lines 5—5 of FIG. 1, illustrating the operation of the anti-theft device.

In operation, as shown in FIGS. 1 and 5, the hooks 13 and 32 of the base plate 11 and the casing 3 may first be engaged onto the outer peripheral portion of the steering wheel 5. The lever 4 may then be pulled or moved relative to the housing 2 and the beam 33 in order to engage the catch 41 with the stop rib 36 of the beam 33, and in order to solidly force the hooks 13 and 32 of the base plate 11 and the casing 3 onto the steering wheel 5. The lock tongue 27 may then be engaged through the selected aperture 43 of the lever 4 and the orifice 15 of the base plate 11, in order to lock the lever 4 and the beam 33 and the base plate 11 together. The lever 4 is extended outward of the housing 2 and may thus be used for preventing the steering wheel 5 from being rotated and operated by the unauthorized persons.

As shown in FIG. 4, when the lever 4 is moved or engaged into the housing 2, the catch 41 of the lever 4 may be disengaged from the end rib 36 of the beam 33, and may be moved toward the stop shoulder 35 of the beam 33, such that the catch 41 may still be moved along the channel 34 of the beam and may still be moved relative to the beam 33, for allowing the beam 33 to be pulled and moved outward of the housing 2, and for allowing the hooks 13 and 32 of the base plate 11 and the casing 3 to be easily engaged onto the steering wheel 5.

Accordingly, the anti-theft device in accordance with the present invention includes a simplified configuration for allowing the anti-theft device to be easily manufactured and to be easily used and operated by the users.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An anti-theft device for a steering wheel of a vehicle, said anti-theft device comprising:

a base plate including a first end having a first hook for engaging onto the steering wheel, a housing secured on said base plate and including a chamber formed therein, a casing including a second hook for engaging onto the steering wheel, and including a beam extended therefrom and slidably received in said chamber of said housing, said beam including a channel formed therein and defined between a stop shoulder and an end rib, a lever including a first end slidably received in said chamber of said housing and having a catch extended therefrom and slidably engaged in said channel of said beam and movable between said stop shoulder and said end rib of said beam, said lever including a second end extendible outward of said housing, and means for locking said lever to said housing and said base plate, to secure said casing and said base plate together and to secure said casing and said base plate on the steering wheel.

2. The anti-theft device according to claim 1, wherein said lever includes a plurality of apertures formed therein, said base plate includes an orifice formed therein, said locking means includes a lock core having a lock tongue selectively engaged through said apertures of said lever and said orifice of said base for locking said lever and said base plate together.

3. The anti-theft device according to claim 1, wherein said lever includes a hand grip provided on said second end thereof for pulling said lever outward of said chamber of said housing.

\* \* \* \* \*